United States Patent
Dai et al.

(10) Patent No.: US 10,849,188 B2
(45) Date of Patent: Nov. 24, 2020

(54) DATA TRANSMISSION DEVICE, METHOD, AND SYSTEM

(71) Applicant: HUAWEI TECHNOLOGIES CO., LTD., Shenzhen (CN)

(72) Inventors: Xizeng Dai, Beijing (CN); Qiming Li, Beijing (CN); Jing Han, Beijing (CN); Anjian Li, Beijing (CN); Fankui Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 18 days.

(21) Appl. No.: 15/699,108

(22) Filed: Sep. 8, 2017

(65) Prior Publication Data
US 2017/0374707 A1    Dec. 28, 2017

Related U.S. Application Data

(63) Continuation of application No. PCT/CN2015/073883, filed on Mar. 9, 2015.

(51) Int. Cl.
*H04W 84/00* (2009.01)
*H04B 1/707* (2011.01)
*H01Q 1/32* (2006.01)

(52) U.S. Cl.
CPC ........ *H04W 84/005* (2013.01); *H01Q 1/3216* (2013.01); *H04B 1/707* (2013.01); *B63B 2201/16* (2013.01)

(58) Field of Classification Search
CPC ............... H04W 16/14; H04W 72/042; H04W 72/0453; H04W 72/1215; H04W 72/1289; H04W 74/006; H04W 84/005
(Continued)

(56) References Cited

U.S. PATENT DOCUMENTS

2004/0248519 A1* 12/2004 Niemela ................ H04B 7/015
                                                             455/67.11
2009/0286485 A1* 11/2009 Tomokiyo ........... H04L 27/0014
                                                             455/67.16
(Continued)

FOREIGN PATENT DOCUMENTS

CN        101369882 A      2/2009
CN        101567708        10/2009
(Continued)

OTHER PUBLICATIONS

International Search Report, dated Oct. 30, 2015, in International Application No. PCT/CN2015/073883 (4 pp.).
(Continued)

*Primary Examiner* — Ajibola A Akinyemi
(74) *Attorney, Agent, or Firm* — Leydig, Voit & Mayer, Ltd.

(57) ABSTRACT

Embodiments of the present invention relate to the communications field and disclose a data transmission device, method, and system, so as to better improve an average downlink throughput of UE. A specific solution is: A determining unit determines a downlink frequency shift according to a received uplink signal sent by a terminal device, and determines a second transmit frequency according to the downlink frequency shift and a first transmit frequency; and a sending unit sends a downlink signal to the terminal device according to the second transmit frequency determined by the determining unit, so that the terminal device receives the downlink signal according to a receive frequency corresponding to the first transmit frequency, where the downlink signal includes at least one of a DMRS or downlink data. The present invention is applied in a data transmission process.

16 Claims, 8 Drawing Sheets

(58) Field of Classification Search
USPC .......................................................... 455/99
See application file for complete search history.

(56) References Cited

U.S. PATENT DOCUMENTS

| | | | | |
|---|---|---|---|---|
| 2010/0246528 A1* | 9/2010 | Huang | ................ | H04L 27/2657 |
| | | | | 370/330 |
| 2013/0034070 A1* | 2/2013 | Seo | ....................... | H04L 5/0082 |
| | | | | 370/329 |
| 2017/0041880 A1* | 2/2017 | Ouchi | ................ | H04W 52/146 |

FOREIGN PATENT DOCUMENTS

| | | |
|---|---|---|
| CN | 101594179 | 12/2009 |
| CN | 102006116 | 4/2011 |
| WO | WO2014149062 | 9/2014 |

OTHER PUBLICATIONS

Chinese Office Action dated Jul. 30, 2018 in corresponding Chinese Patent Application No. 201580035704.5, 7 pgs.
International Search Report dated Oct. 30, 2015 in corresponding International Patent Application No. PCT/CN2015/073883.

* cited by examiner

DATA TRANSMISSION DEVICE, METHOD, AND SYSTEM

CROSS-REFERENCE TO RELATED APPLICATIONS

This application is a continuation of International Application No. PCT/CN2015/073883, filed on Mar. 9, 2015, the disclosure of which is hereby incorporated by reference in its entirety.

TECHNICAL FIELD

The present disclosure relates to the communications field, and in particular, to a data transmission device, method, and system.

BACKGROUND

With rapid development of high-speed trains, people often choose a convenient means of transportation such as a high-speed train. In addition, as user equipments (UE) are used widely, people have an increasing demand for data services of a high-speed railway mobile communications network when taking a high-speed train. Therefore, how to improve a throughput of UE in the high-speed railway mobile communications network is a concern of operators.

When UE moves at a high speed, a Doppler frequency shift phenomenon occurs in a high-speed railway mobile communications network. In this case, it is likely that the UE cannot correctly demodulate data sent by a base station, resulting in a low average downlink throughput of the UE. UE generally estimates a Doppler frequency shift according to a received common reference signal (CRS), and after receiving a demodulation reference signal (DMRS) and data that are sent by a base station, performs frequency compensation according to the estimated Doppler frequency shift, and demodulates the DMRS and the data. This improves demodulation performance for the DMRS and the data, thereby improving an average downlink throughput of the UE.

However, in the high-speed railway mobile communications network, an expected demodulation performance for the DMRS and the data cannot be obtained, and the average downlink throughput of the UE cannot be improved better.

SUMMARY

Embodiments of the present invention provide a data transmission device, method, and system, so as to better improve an average downlink throughput of UE.

To achieve the foregoing objective, the present invention uses the following technical solutions.

According to a first aspect of the present invention, an access network device is provided, where the access network device is applied to a high-speed mobile communications system, such as a high-speed railway mobile communications system, and the access network device includes a determining unit and a sending unit, where the determining unit is configured to determine a downlink frequency shift according to a received uplink signal sent by a terminal device, and determine a second transmit frequency according to the downlink frequency shift and a first transmit frequency; and the sending unit is configured to send a downlink signal to the terminal device according to the second transmit frequency determined by the determining unit, so that the terminal device receives the downlink signal according to a receive frequency corresponding to the first transmit frequency, where the downlink signal includes at least one of a demodulation reference signal DMRS or downlink data.

With reference to the first aspect, in a possible implementation, the sending unit is further configured to send indication information to the terminal device before sending the downlink signal to the terminal device according to the second transmit frequency, where the indication information is used to indicate that the access network device has performed frequency compensation.

With reference to the first aspect or the foregoing possible implementation, in another possible implementation, the sending unit is configured to send the indication information to the terminal device by using a radio resource control RRC connection reconfiguration message.

With reference to the first aspect or the foregoing possible implementation, in another possible implementation, the sending unit is configured to send the indication information to the terminal device by using a system message.

With reference to the first aspect or the foregoing possible implementations, in another possible implementation, the determining unit is configured to determine an uplink frequency shift according to the uplink signal, and determine the downlink frequency shift according to the uplink frequency shift, where the uplink frequency shift and the downlink frequency shift satisfy the following condition:

$\Delta fDL = 0.5 * \Delta fUL$, where $\Delta DL$ is the downlink frequency shift, and $\Delta fUL$ s the uplink frequency shift.

With reference to the first aspect or the foregoing possible implementation, in another possible implementation, the determining unit is further configured to: after determining the uplink frequency shift according to the uplink signal, determine that the uplink frequency shift is greater than a first preset threshold.

With reference to the first aspect or the foregoing possible implementations, in another possible implementation, the determining unit is further configured to: before determining the downlink frequency shift according to the received uplink signal sent by the terminal device, determine that a moving speed of the terminal device is greater than a second preset threshold.

According to a second aspect of the present invention, a terminal device is provided, where the terminal device is applied to a high-speed mobile communications system, such as a high-speed railway mobile communications system, and the terminal device includes a receiving unit and a demodulation unit, where the receiving unit is configured to receive a downlink signal according to a receive frequency, where the receive frequency is corresponding to a first transmit frequency, the downlink signal is sent by an access network device to the terminal device according to a second transmit frequency, the second transmit frequency is determined according to a downlink frequency shift and the first transmit frequency, and the downlink signal includes at least one of a demodulation reference signal DMRS or downlink data; and the demodulation unit is configured to demodulate, according to the receive frequency, the downlink signal received by the receiving unit.

With reference to the second aspect, in a possible implementation, the receiving unit is further configured to: before receiving the downlink signal according to the receive frequency, receive indication information sent by the access network device, where the indication information is used to indicate that the access network device has performed frequency compensation.

According to a third aspect of the present invention, a data transmission method is provided, where the method is applied to a high-speed mobile communications system, such as a high-speed railway mobile communications system, and the method includes:

determining, by an access network device, a downlink frequency shift according to a received uplink signal sent by a terminal device;

determining, by the access network device, a second transmit frequency according to the downlink frequency shift and a first transmit frequency; and sending, by the access network device, a downlink signal to the terminal device according to the second transmit frequency, so that the terminal device receives the downlink signal according to a receive frequency corresponding to the first transmit frequency, where the downlink signal includes at least one of a demodulation reference signal DMRS or downlink data.

With reference to the third aspect, in a possible implementation, before the sending, by the access network device, a downlink signal to the terminal device according to the second transmit frequency, the method further includes:

sending, by the access network device, indication information to the terminal device, where the indication information is used to indicate that the access network device has performed frequency compensation.

With reference to the third aspect or the foregoing possible implementation, in another possible implementation, the sending, by the access network device, indication information to the terminal device includes:

sending, by the access network device, the indication information to the terminal device by using a radio resource control RRC connection reconfiguration message.

With reference to the third aspect or the foregoing possible implementation, in another possible implementation, the sending, by the access network device, indication information to the terminal device includes:

sending, by the access network device, the indication information to the terminal device by using a system message.

With reference to the third aspect or the foregoing possible implementations, in another possible implementation, the determining, by an access network device, a downlink frequency shift according to a received uplink signal sent by a terminal device includes:

determining, by the access network device, an uplink frequency shift according to the uplink signal; and determining, by the access network device, the downlink frequency shift according to the uplink frequency shift, where the uplink frequency shift and the downlink frequency shift satisfy the following condition:

$$\Delta fDL = 0.5 * \Delta fUL,$$ where $\Delta fDL$ is the downlink frequency shift, and $\Delta fUL$ is the uplink frequency shift.

With reference to the third aspect or the foregoing possible implementation, in another possible implementation, after the determining, by the access network device, an uplink frequency shift according to the uplink signal, the method further includes:

determining, by the access network device, that the uplink frequency shift is greater than a first preset threshold.

With reference to the third aspect or the foregoing possible implementations, in another possible implementation, before the determining, by the access network device, a downlink frequency shift according to a received uplink signal sent by a terminal device, the method further includes:

determining, by the access network device, that a moving speed of the terminal device is greater than a second preset threshold.

According to a fourth aspect of the present invention, a data transmission method is provided, where the data transmission method is applied to a high-speed mobile communications system, such as a high-speed railway mobile communications system, and the method includes:

receiving, by a terminal device, a downlink signal according to a receive frequency, where the receive frequency is corresponding to a first transmit frequency, the downlink signal is sent by an access network device to the terminal device according to a second transmit frequency, the second transmit frequency is determined according to a downlink frequency shift and the first transmit frequency, and the downlink signal includes at least one of a demodulation reference signal DMRS or downlink data; and demodulating, by the terminal device, the downlink signal according to the receive frequency.

With reference to the fourth aspect, in a possible implementation, before the receiving, by a terminal device, a downlink signal according to a receive frequency, the method further includes:

receiving, by the terminal device, indication information sent by the access network device, where the indication information is used to indicate that the access network device has performed frequency compensation.

According to a fifth aspect of the present invention, an access network device is provided, where the access network device is applied to a high-speed mobile communications system, such as a high-speed railway mobile communications system, and the access network device includes a processor and a transmitter, where the processor is configured to determine a downlink frequency shift according to a received uplink signal sent by a terminal device, and determine a second transmit frequency according to the downlink frequency shift and a first transmit frequency; and the transmitter is configured to send a downlink signal to the terminal device according to the second transmit frequency determined by the processor, so that the terminal device receives the downlink signal according to a receive frequency corresponding to the first transmit frequency, where the downlink signal includes at least one of a demodulation reference signal DMRS or downlink data.

With reference to the fifth aspect, in a possible implementation, the transmitter is further configured to send indication information to the terminal device before sending the downlink signal to the terminal device according to the second transmit frequency, where the indication information is used to indicate that the access network device has performed frequency compensation.

With reference to the fifth aspect or the foregoing possible implementation, in another possible implementation, the transmitter is configured to send the indication information to the terminal device by using a radio resource control RRC connection reconfiguration message.

With reference to the fifth aspect or the foregoing possible implementations, in another possible implementation, the transmitter is configured to send the indication information to the terminal device by using a system message.

With reference to the fifth aspect or the foregoing possible implementations, in another possible implementation, the processor is configured to determine an uplink frequency shift according to the uplink signal, and determine the downlink frequency shift according to the uplink frequency shift, where the uplink frequency shift and the downlink frequency shift satisfy the following condition:

$\Delta fDL=0.5*\Delta fUL$, where $\Delta fDL$ is the downlink frequency shift, and $\Delta fUL$ is the uplink frequency shift.

With reference to the fifth aspect or the foregoing possible implementations, in another possible implementation, the processor is further configured to: after determining the uplink frequency shift according to the uplink signal, determine that the uplink frequency shift is greater than a first preset threshold.

With reference to the fifth aspect or the foregoing possible implementations, in another possible implementation, the processor is further configured to: before determining the downlink frequency shift according to the received uplink signal sent by the terminal device, determine that a moving speed of the terminal device is greater than a second preset threshold.

According to a sixth aspect of the present invention, a terminal device is provided, where the terminal device is applied to a high-speed mobile communications system, such as a high-speed railway mobile communications system, and the terminal device includes a receiver and a processor, where the receiver is configured to receive a downlink signal according to a receive frequency, where the receive frequency is corresponding to a first transmit frequency, the downlink signal is sent by an access network device to the terminal device according to a second transmit frequency, the second transmit frequency is determined according to a downlink frequency shift and the first transmit frequency, and the downlink signal includes at least one of a demodulation reference signal DMRS or downlink data; and the processor is configured to demodulate, according to the receive frequency, the downlink signal received by the receiver.

With reference to the sixth aspect, in a possible implementation, the receiver is further configured to: before receiving the downlink signal according to the receive frequency, receive indication information sent by the access network device, where the indication information is used to indicate that the access network device has performed frequency compensation.

According to a seventh aspect of the present invention, a data transmission system is provided, where the data transmission system includes an access network device and a terminal device, where the access network device is configured to: determine a downlink frequency shift according to a received uplink signal sent by the terminal device; determine a second transmit frequency according to the downlink frequency shift and a first transmit frequency; and send a downlink signal to the terminal device according to the second transmit frequency, so that the terminal device receives the downlink signal according to a receive frequency corresponding to the first transmit frequency, where the downlink signal includes at least one of a demodulation reference signal DMRS or downlink data; and the terminal device is configured to receive the downlink signal according to the receive frequency, and demodulate the downlink signal according to the receive frequency, where the receive frequency is corresponding to the first transmit frequency.

According to the data transmission device, method, and system provided in the embodiments of the present invention, after determining a downlink frequency shift, an access network device determines a second transmit frequency according to the determined downlink frequency shift and a first transmit frequency, to implement frequency compensation for the first transmit frequency, and sends a downlink signal to a terminal device according to the second transmit frequency. Performance of the access network device is superior to performance of the terminal device, that is, there is a relatively small error between the downlink frequency shift estimated by the access network device and an actual downlink frequency shift in a network, and the access network device can compensate for a relatively large downlink frequency shift. Therefore, before the access network device sends the downlink signal to the terminal device, the access network device may estimate the downlink frequency shift, perform frequency compensation for the first transmit frequency according to the estimated downlink frequency shift, to obtain the second transmit frequency, and send the downlink signal to the terminal device according to the second transmit frequency. In this way, the downlink signal received by the terminal device may be basically free from a frequency shift, so that the terminal device may directly receive the downlink signal according to a receive frequency corresponding to the first transmit frequency, and demodulate the downlink signal according to the receive frequency. This improves demodulation performance for the downlink signal, thereby improving an average downlink throughput of the terminal device.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
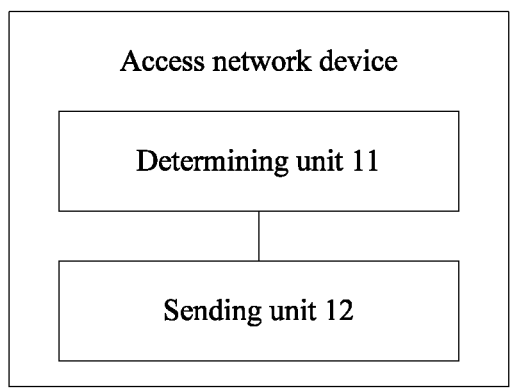
FIG. 1 is a schematic structural diagram of an access network device according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A data transmission method provided in the embodiments of the present invention is applied to a high-speed mobile communications system, such as a high-speed railway mobile communications system. The high-speed railway mobile communications system includes an access network device and a terminal device. For example, the access network device is a base station, and the terminal device is UE. A Doppler frequency shift phenomenon occurs in the high-speed railway mobile communications system due to a high-speed movement of the UE, that is, there is a shift between a receive frequency used by the UE to receive a downlink signal (including at least one of a DMRS or data) sent by the base station and a transmit frequency of the base station. To improve an average downlink throughput of the UE, after receiving the downlink signal sent by the base station, the UE first performs frequency compensation for the receive frequency, and then receives and demodulates the downlink signal according to a compensated receive frequency. However, a higher moving speed of the UE causes a larger actual Doppler frequency shift in the high-speed railway mobile communications system, but a compensation capability of the UE is limited, that is, the UE cannot compensate for a relatively large Doppler frequency shift. As a result, reception and demodulation of the downlink signal sent by the base station is affected, and the average downlink throughput of the UE cannot be improved better. According to the data transmission method provided in the embodiments of the present invention, before the base station sends the downlink signal to the UE, the base station may perform frequency compensation for the first transmit frequency to obtain a second transmit frequency, and send the downlink signal to the terminal device according to the second transmit frequency. In this way, there is basically no shift between the receive frequency used by the UE to receive the downlink signal sent by base station and the transmit frequency of the base station, so that the UE may directly receive and demodulate the downlink signal according to the receive frequency corresponding to the first transmit frequency. Therefore, the average downlink throughput of the UE can be improved better.

For convenience of understanding of a person skilled in the art, for specific implementation processes of the technical solutions provided in the present invention, refer to the following embodiments provided in the present invention.

An embodiment of the present invention provides an access network device. As shown in FIG. 1, the access network device includes a determining unit 11 and a sending unit 12.

The determining unit 11 is configured to determine a downlink frequency shift according to a received uplink signal sent by a terminal device, and determine a second transmit frequency according to the determined downlink frequency shift and a first transmit frequency.

The sending unit 12 is configured to send a downlink signal to the terminal device according to the second transmit frequency determined by the determining unit 11, so that the terminal device receives the downlink signal according to a receive frequency corresponding to the first transmit frequency, where the downlink signal includes at least one of a demodulation reference signal DMRS or downlink data.

In this embodiment of the present invention, further, the sending unit 12 is further configured to send indication information to the terminal device before sending the downlink signal to the terminal device according to the second transmit frequency.

The indication information is used to indicate that the access network device has performed frequency compensation.

In this embodiment of the present invention, further, the sending unit 12 is configured to send the indication information to the terminal device by using a radio resource control (RRC) connection reconfiguration message.

In this embodiment of the present invention, further, the sending unit 12 is configured to send the indication information to the terminal device by using a system message.

In this embodiment of the present invention, further, the determining unit 11 is configured to determine an uplink frequency shift according to the received uplink signal sent by the terminal device, and determine the downlink frequency shift according to the determined uplink frequency shift.

The uplink frequency shift and the downlink frequency shift satisfy the following condition: $\Delta fDL = 0.5 * \Delta fUL$, where $\Delta fDL$ is the downlink frequency shift, and $\Delta fUL$ is the uplink frequency shift.

In this embodiment of the present invention, further, for an application scenario in which a public network is deployed for a mobile communications system, the determining unit 11 is further configured to: after determining the uplink frequency shift according to the uplink signal, determine that the uplink frequency shift is greater than a first preset threshold.

In this embodiment of the present invention, further, for an application scenario in which a public network is deployed for a mobile communications system, the determining unit 11 is further configured to: before determining the downlink frequency shift according to the received uplink signal sent by the terminal device, determine that a moving speed of the terminal device is greater than a second preset threshold.

After determining a downlink frequency shift, the access network device provided in this embodiment of the present invention determines a second transmit frequency according to the determined downlink frequency shift and a first transmit frequency, to implement frequency compensation for the first transmit frequency; and sends a downlink signal to a terminal device according to the second transmit frequency. Performance of the access network device is superior to performance of the terminal device, that is, there is a relatively small error between the downlink frequency shift estimated by the access network device and an actual downlink frequency shift in a network, and the access network device can compensate for a relatively large downlink frequency shift. Therefore, before the access network device sends the downlink signal to the terminal device, the access network device may estimate the downlink frequency shift, perform frequency compensation for the first transmit frequency according to the estimated downlink frequency shift, to obtain the second transmit frequency, and send the downlink signal to the terminal device according to the second transmit frequency. In this way, the downlink signal received by the terminal device may be basically free from a frequency shift, so that the terminal device may directly receive the downlink signal according to a receive frequency corresponding to the first transmit frequency, and demodulate the downlink signal according to the receive frequency. This improves demodulation performance for the downlink signal, thereby improving an average downlink throughput of the terminal device.

Figure 2:
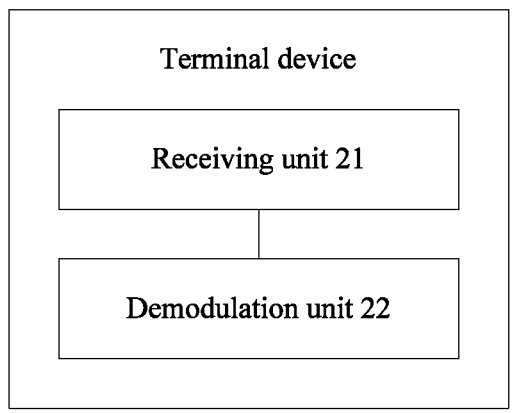
FIG. 2 is a schematic structural diagram of a terminal device according to an embodiment of the present invention.

Another embodiment of the present invention provides a terminal device. As shown in FIG. 2, the terminal device may include a receiving unit 21 and a demodulation unit 22.

The receiving unit 21 is configured to receive a downlink signal according to a receive frequency, where the receive frequency is corresponding to a first transmit frequency, the downlink signal is sent by an access network device to the terminal device according to a second transmit frequency, the second transmit frequency is determined according to a downlink frequency shift and the first transmit frequency, and the downlink signal includes at least one of a DMRS or downlink data.

The demodulation unit 22 is configured to demodulate, according to the receive frequency, the downlink signal received by the receiving unit 21.

In this embodiment of the present invention, further, the receiving unit 21 is further configured to: before receiving the downlink signal according to the receive frequency, receive indication information sent by the access network device.

The indication information is used to indicate that the access network device has performed frequency compensation.

The terminal device provided in this embodiment of the present invention receives a downlink signal according to a receive frequency corresponding to a first transmit frequency, where the downlink signal is sent by an access network device to the terminal device according to a second transmit frequency, and the second transmit frequency is determined by the access network device according to a downlink frequency shift and the first transmit frequency; and may demodulate the downlink signal according to the receive frequency after receiving the downlink signal. Performance of the access network device is superior to performance of the terminal device, that is, there is a relatively small error between the downlink frequency shift estimated by the access network device and an actual downlink frequency shift, and the access network device can compensate for a relatively large downlink frequency shift. Therefore, before the access network device sends the downlink signal to the terminal device, the access network device may estimate the downlink frequency shift, perform frequency compensation for the first transmit frequency according to the estimated downlink frequency shift, to obtain the second transmit frequency, and send the downlink signal to the terminal device according to the second transmit frequency. In this way, the downlink signal received by the terminal device may be basically free from a frequency shift, so that the terminal device may directly receive the downlink signal according to a receive frequency corresponding to the first transmit frequency, and demodulate the downlink signal according to the receive frequency. This improves demodulation performance for the downlink signal, thereby improving an average downlink throughput of the terminal device.

Figure 3:
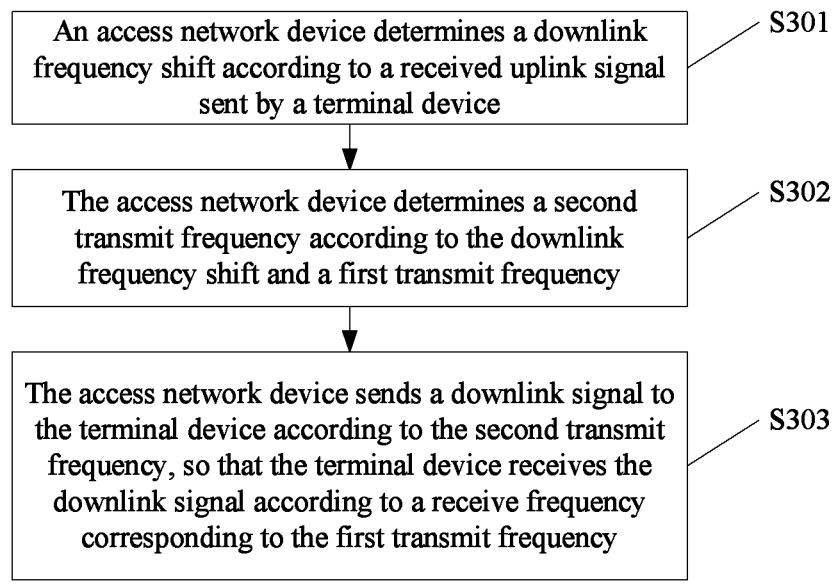
FIG. 3 is a flowchart of a data transmission method according to another embodiment of the present invention.

Another embodiment of the present invention provides a data transmission method. As shown in FIG. 3, the method may include the following steps.

S301: An access network device determines a downlink frequency shift according to a received uplink signal sent by a terminal device.

S302: The access network device determines a second transmit frequency according to the downlink frequency shift and a first transmit frequency.

After determining the downlink frequency shift according to the received uplink signal, the access network device may perform frequency compensation for the first transmit frequency according to the downlink frequency shift, to obtain the second transmit frequency.

S303: The access network device sends a downlink signal to the terminal device according to the second transmit frequency, so that the terminal device receives the downlink signal according to a receive frequency corresponding to the first transmit frequency.

The downlink signal may include at least one of a DMRS or downlink data. The receive frequency corresponding to the first transmit frequency means that there is basically no shift between the receive frequency and the first transmit frequency, that is, the receive frequency is basically equal in value to the first transmit frequency.

According to the data transmission method provided in this embodiment of the present invention, after determining a downlink frequency shift, an access network device determines a second transmit frequency according to the determined downlink frequency shift and a first transmit frequency, to implement frequency compensation for the first transmit frequency, and sends a downlink signal to a terminal device according to the second transmit frequency. Performance of the access network device is superior to performance of the terminal device, that is, there is a relatively small error between the downlink frequency shift estimated by the access network device and an actual downlink frequency shift in a network, and the access network device can compensate for a relatively large downlink frequency shift. Therefore, before the access network device sends the downlink signal to the terminal device, the access network device may estimate the downlink frequency shift, perform frequency compensation for the first transmit frequency according to the estimated downlink frequency shift, to obtain the second transmit frequency, and send the downlink signal to the terminal device according to the second transmit frequency. In this way, the downlink signal received by the terminal device may be basically free from a frequency shift, so that the terminal device may directly receive the downlink signal according to a receive frequency corresponding to the first transmit frequency, and demodulate the downlink signal according to the receive frequency.

This improves demodulation performance for the downlink signal, thereby improving an average downlink throughput of the terminal device.

Further, to make the terminal device learn that the access network device has performed frequency compensation before sending the downlink signal, before performing S303, the access network device needs to send indication information to the terminal device.

The indication information is used to indicate that the access network device has performed frequency compensation.

Certainly, the indication information may also be used to indicate that the terminal device does not need to continue to perform frequency compensation. This embodiment of the present invention does not impose specific limitations on a specific function of the indication information.

Further, in a possible implementation, a process that the access network device sends the indication information to the terminal device may be: The access network device sends the indication information to the terminal device by using an RRC connection reconfiguration message.

Further, in another possible implementation, a process that the access network device sends the indication information to the terminal device may be: The access network device sends the indication information to the terminal device by using a system message.

Further, S301 is: The access network device determines an uplink frequency shift according to the received uplink signal sent by the terminal device, and determines the downlink frequency shift according to the determined uplink frequency shift.

The uplink frequency shift and the downlink frequency shift satisfy the following condition: $\Delta fDL = 0.5 * \Delta fUL$, where $\Delta fDL$ is the downlink frequency shift, and $\Delta fUL$ is the uplink frequency shift.

Further, in a possible implementation, for an application scenario in which a public network is deployed for a mobile communications system, after determining the uplink frequency shift according to the uplink signal, the access network device may determine whether the uplink frequency shift is greater than a first preset threshold, and when determining that the uplink frequency shift is greater than the first preset threshold, determine the downlink frequency shift according to the uplink frequency shift.

Further, in another possible implementation, for an application scenario in which a public network is deployed for a mobile communications system, before performing S301, the access network device needs to determine whether a moving speed of the terminal device is greater than a second preset threshold, and when determining that the moving speed of the terminal device is greater than the second preset threshold, performs S301.

Figure 4:
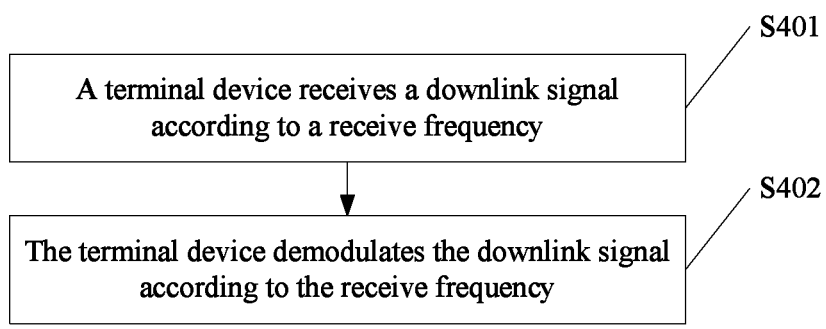
FIG. 4 is a flowchart of a data transmission method according to another embodiment of the present invention.

Another embodiment of the present invention provides a data transmission method. As shown in FIG. 4, the method may include the following steps.

S401: A terminal device receives a downlink signal according to a receive frequency.

The receive frequency is corresponding to a first transmit frequency. The downlink signal is sent by an access network device to the terminal device according to a second transmit frequency. The second transmit frequency is determined by the access network device according to a downlink frequency shift and the first transmit frequency. The downlink signal includes at least one of a DMRS or downlink data.

S402: The terminal device demodulates the downlink signal according to the receive frequency.

After receiving the downlink signal according to the receive frequency, the terminal device may demodulate the downlink signal according to the receive frequency, so as to successfully receive the downlink signal after successfully demodulating the downlink signal.

According to the data transmission method provided in this embodiment of the present invention, a terminal device receives a downlink signal according to a receive frequency corresponding to a first transmit frequency, where the downlink signal is sent by an access network device to the terminal device according to a second transmit frequency, and the second transmit frequency is determined by the access network device according to a downlink frequency shift and the first transmit frequency; and may demodulate the downlink signal according to the receive frequency after receiving the downlink signal. Performance of the access network device is superior to performance of the terminal device, that is, there is a relatively small error between the downlink frequency shift estimated by the access network device and an actual downlink frequency shift in a network, and the access network device can compensate for a relatively large downlink frequency shift. Therefore, before the access network device sends the downlink signal to the terminal device, the access network device may estimate the downlink frequency shift, perform frequency compensation for the first transmit frequency according to the estimated downlink frequency shift, to obtain the second transmit frequency, and send the downlink signal to the terminal device according to the second transmit frequency. In this way, the downlink signal received by the terminal device may be basically free from a frequency shift, so that the terminal device may directly receive the downlink signal according to a receive frequency corresponding to the first transmit frequency, and demodulate the downlink signal according to the receive frequency. This improves demodulation performance for the downlink signal, thereby improving an average downlink throughput of the terminal device.

Further, to make the terminal device learn that the access network device has performed frequency compensation before sending the downlink signal, before performing S401, the terminal device receives indication information sent by the access network device.

The indication information is used to indicate that the access network device has performed frequency compensation.

It should be noted that the terminal device in this embodiment of the present invention may be UE, or may be a relay. A corresponding terminal device may be selected according to an actual application scenario need. This is not limited in this embodiment of the present invention.

It should be noted that this embodiment of the present invention is described only by using an example in which a mobile communications system is the LTE system. Certainly, this embodiment of the present invention may also be applied to another mobile communications system. This is not limited in this embodiment of the present invention.

Another embodiment of the present invention provides a data transmission method. To facilitate understanding of a person skilled in the art, in this embodiment of the present invention, a specific implementation process of the data transmission method provided in this embodiment of the present invention is described in detail according to different application scenarios. Details are as follows:

In a scenario in which a high-speed railway mobile communications network is deployed by using a remote radio unit, an access network device is a base station including a BBU and an RRU, and a terminal device is UE.

Figure 5:
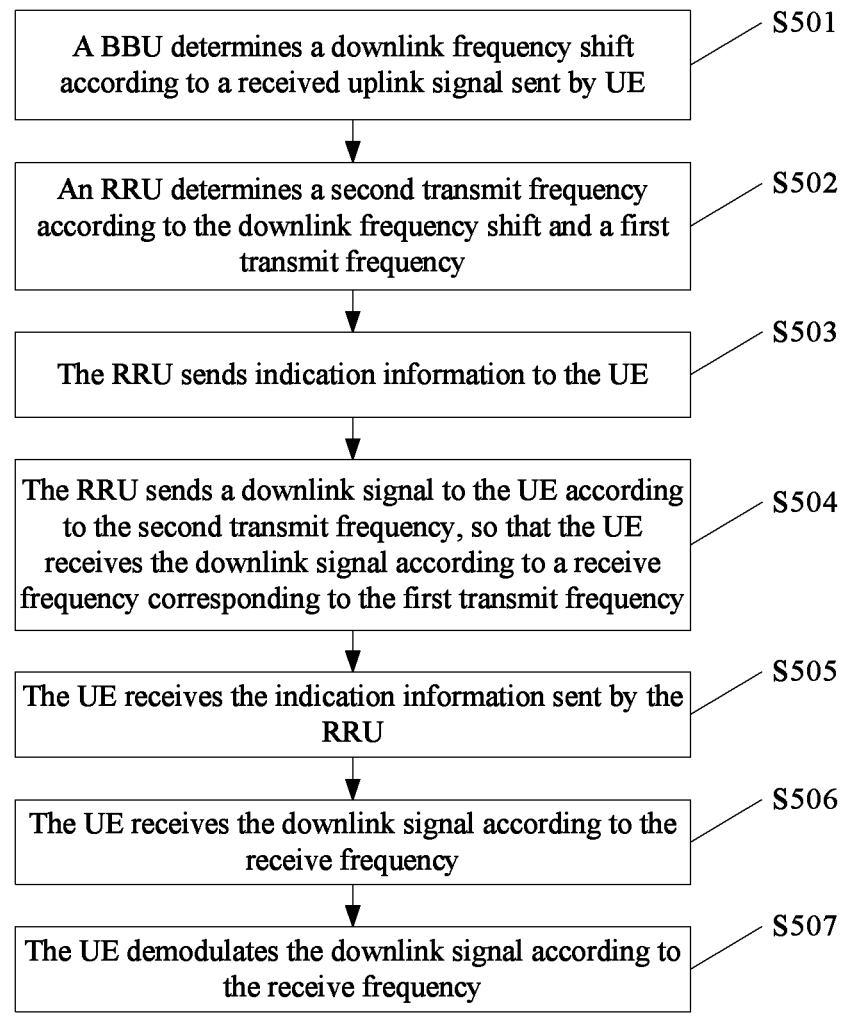
FIG. 5 is a flowchart of a data transmission method according to another embodiment of the present invention.

A data transmission method in this application scenario is shown in FIG. 5. Specifically, the method may include the following steps.

S501: The BBU determines a downlink frequency shift according to a received uplink signal sent by the UE.

Specifically, S501 may include S5011 to S5012:

S5011: The BBU determines an uplink frequency shift according to the received uplink signal sent by the UE.

The BBU may determine the uplink frequency shift according to the received uplink signal to implement frequency shift estimation on an uplink.

S5012: The BBU determines the downlink frequency shift according to the uplink frequency shift.

After the BBU determines the uplink frequency shift according to the received uplink signal sent by the UE, the BBU may determine the downlink frequency shift according to the determined uplink frequency shift.

The uplink frequency shift and the downlink frequency shift satisfy the following condition: $\Delta fDL=0.5*\Delta fUL$, where $\Delta fDL$ is the downlink frequency shift, and $\Delta fUL$ is the uplink frequency shift. For example, if the uplink frequency shift determined by the BBU is 1200 Hz, the downlink frequency shift determined by the BBU according to the uplink frequency shift is 600 Hz.

S502: The RRU determines a second transmit frequency according to the downlink frequency shift and a first transmit frequency.

The RRU may perform frequency compensation for the first transmit frequency according to the downlink frequency shift obtained by means of calculation, to obtain the second transmit frequency. The first transmit frequency is a preset frequency corresponding to a frequency channel number used when the RRU performs data transmission with the UE.

S503: The RRU sends indication information to the UE.

The indication information is used to indicate that the RRU has performed frequency compensation. A quantity of bits of the indication information may be 1. Generally, "1" may be used to indicate that the RRU has performed frequency compensation, and "0" is used to indicate that the RRU has not performed frequency compensation.

Optionally, the RRU may send the indication information to the UE by using an RRC connection reconfiguration message, or may send the indication information to the UE by using a system message.

It should be noted that the access network device may first execute S501 to S502, and then execute S503, or may first execute S503, and then execute S501 to S502 (that is, after the UE accesses a high-speed railway mobile communications network, the RRU may send the indication information to the UE, so that the UE learns that the RRU has performed frequency compensation for the first transmit frequency carrying a downlink signal). This embodiment of the present invention does not impose a limitation on an execution order of S501 to S502, and S503, and the execution order may be selected according to different actual application scenarios accordingly.

S504: The RRU sends a downlink signal to the UE according to the second transmit frequency, so that the UE receives the downlink signal according to a receive frequency corresponding to the first transmit frequency.

The downlink signal may include at least one of a DMRS or downlink data. After the RRU performs frequency compensation for the first transmit frequency according to the determined downlink frequency shift to obtain the second transmit frequency, the RRU may send the downlink signal to the UE according to the second transmit frequency. In a possible implementation, the second transmit frequency is equal to a difference between the first transmit frequency and the downlink frequency shift.

S505: The UE receives the indication information sent by the RRU.

S506: The UE receives the downlink signal according to the receive frequency.

The receive frequency is corresponding to the first transmit frequency. According to S501 to S504, it may be learned that the downlink signal is sent by the RRU to the UE according to the second transmit frequency, the second transmit frequency is determined by the RRU according to the downlink frequency shift and the first transmit frequency, and the downlink signal may include at least one of a DMRS or downlink data.

S507: The UE demodulates the downlink signal according to the receive frequency.

After the UE receives the indication information sent by the RRU, the UE may learn that the RRU has performed frequency compensation before sending the downlink signal. In this way, the UE may directly receive and demodulate the downlink signal according to the receive frequency (the receive frequency is corresponding to the first transmit frequency) at which the downlink signal is received, instead of that after estimating the downlink frequency shift according to a CRS, the UE performs channel estimation and demodulation on the downlink signal according to the estimated downlink frequency shift.

According to the data transmission method provided in this embodiment of the present invention, after the BBU determines a downlink frequency shift according to a received uplink signal sent by UE, an RRU may perform frequency compensation for a first transmit frequency according to the determined downlink frequency shift, to obtain a second transmit frequency, and sends a downlink signal to the UE according to the second transmit frequency. Before sending the downlink signal, the RRU has performed compensation for the first transmit frequency. In this way, the downlink signal received by the UE may be basically free from a frequency shift, so that the UE may directly receive and demodulate the downlink signal according to a receive frequency corresponding to the first transmit frequency. This improves demodulation performance for the downlink signal, thereby improving an average downlink throughput of the UE.

Figure 6:
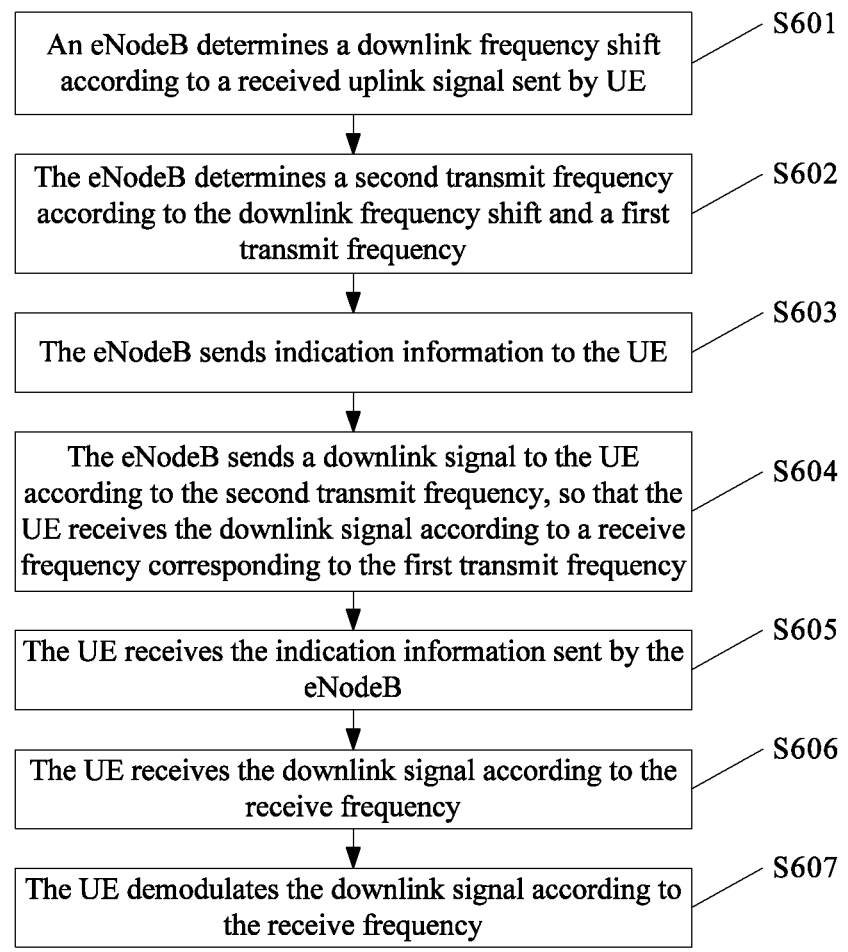
FIG. 6 is a flowchart of another data transmission method according to another embodiment of the present invention.

In a scenario in which an independent base station is used to deploy a high-speed railway mobile communications network, an access network device is an eNodeB, and a terminal device is UE. A data transmission method in this application scenario is shown in FIG. 6. Specifically, the method may include the following steps.

S601: The eNodeB determines a downlink frequency shift according to a received uplink signal sent by the UE.

Specifically, S601 may include S6011 to S6012:

S6011: The eNodeB determines an uplink frequency shift according to the received uplink signal sent by the UE.

S6012: The eNodeB determines the downlink frequency shift according to the uplink frequency shift.

S602: The eNodeB determines a second transmit frequency according to the downlink frequency shift and a first transmit frequency.

S603: The eNodeB sends indication information to the UE.

The indication information is used to indicate that the eNodeB has performed frequency compensation.

S604: The eNodeB sends a downlink signal to the UE according to the second transmit frequency, so that the UE receives the downlink signal according to a receive frequency corresponding to the first transmit frequency.

S605: The UE receives the indication information sent by the eNodeB.

S606: The UE receives the downlink signal according to the receive frequency.

The receive frequency is corresponding to the first transmit frequency.

S607: The UE demodulates the downlink signal according to the receive frequency.

It should be noted that, for specific descriptions of S601 to S607 in this embodiment of the present invention, reference may be made to specific descriptions of S501 to S507, and details are not described in this embodiment of the present invention.

According to the data transmission method provided in this embodiment of the present invention, after an eNodeB determines a downlink frequency shift according to a received uplink signal sent by UE, the eNodeB may perform frequency compensation for a first transmit frequency according to the determined downlink frequency shift, to obtain a second transmit frequency, and sends a downlink signal to the UE according to the second transmit frequency. Before sending the downlink signal, the eNodeB has performed compensation for the first transmit frequency. In this way, the downlink signal received by the UE may be basically free from a frequency shift, so that the UE may directly receive and demodulate the downlink signal according to a receive frequency corresponding to the first transmit frequency. This improves demodulation performance for the downlink signal, thereby improving an average downlink throughput of the UE.

Figure 7:
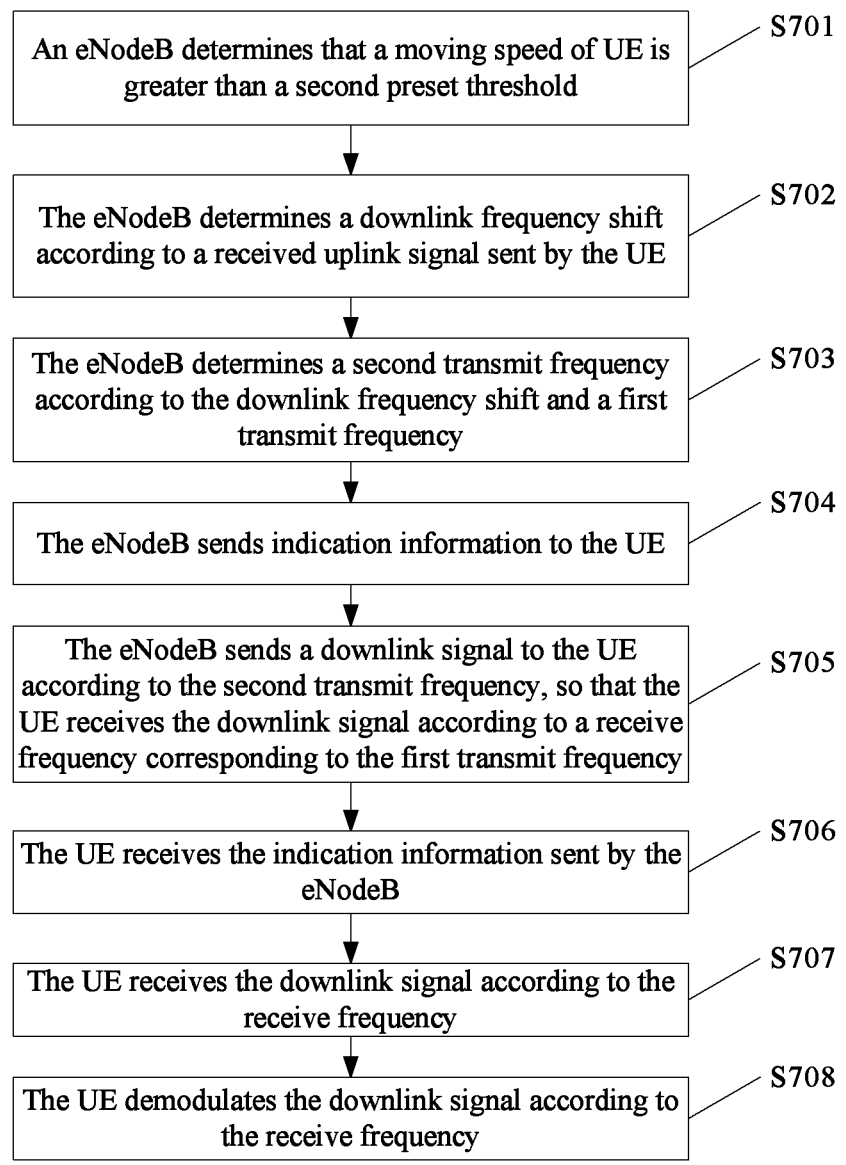
FIG. 7 is a flowchart of another data transmission method according to another embodiment of the present invention.

In a public network (a non high-speed railway mobile communications network) scenario, an access network device is an eNodeB, and a terminal device is UE. A data transmission method in this application scenario is shown in FIG. 7. Specifically, the method may include the following steps.

S701: The eNodeB determines that a moving speed of the UE is greater than a second preset threshold.

For example, the second preset threshold may be 300 km/h. The eNodeB may obtain the moving speed of the UE in a manner of locating the UE. For example, the eNodeB determines that the UE is at a location 1 at a current moment, and after a predetermined time period, determines that the UE is at a location 2. Then, the eNodeB can obtain the moving speed of the UE according to a distance between the location 2 and the location 1 and the predetermined time period. When the eNodeB determines that the moving speed of the UE is not greater than the second preset threshold, the eNodeB may use a prior-art solution to perform data transmission with the UE. Certainly, the eNodeB may also determine the moving speed of the UE by determining a switching frequency of the UE or a frequency at which the UE performs cell reselection. This is not limited in the present invention. Certainly, when the moving speed is equal to the second preset threshold, the eNodeB may use the data transmission method provided in the present invention to perform data transmission with the UE, or may use a prior-art solution to perform data transmission with the UE. A specific method may be selected according to an actual application scenario need. This is not specifically limited in this embodiment of the present invention.

It should be noted that when the access network device is a base station including a BBU and an RRU, the BBU determines whether the moving speed of the UE is greater than the second preset threshold. For a process in which the BBU specifically obtains the moving speed of the UE, reference may be made to a process in which the eNodeB obtains the moving speed of the UE. Details are not described herein.

S702: The eNodeB determines a downlink frequency shift according to a received uplink signal sent by the UE.

Specifically, S702 may include S7021 to S7022:

S7021: The eNodeB determines an uplink frequency shift according to the received uplink signal sent by the UE.

S7022: The eNodeB determines the downlink frequency shift according to the uplink frequency shift.

S703: The eNodeB determines a second transmit frequency according to the downlink frequency shift and a first transmit frequency.

S704: The eNodeB sends indication information to the UE.

The indication information is used to indicate that the eNodeB has performed frequency compensation.

S705: The eNodeB sends a downlink signal to the UE according to the second transmit frequency, so that the UE receives the downlink signal according to a receive frequency corresponding to the first transmit frequency.

S706: The UE receives the indication information sent by the eNodeB.

S707: The UE receives the downlink signal according to the receive frequency.

The receive frequency is corresponding to the first transmit frequency.

S708: The UE demodulates the downlink signal according to the receive frequency.

It should be noted that, for specific descriptions of S702 to S708 in this embodiment of the present invention, reference may be made to specific descriptions of S501 to S507, and details are not described in this embodiment of the present invention.

It should be noted that in S701 to S708 in this embodiment of the present invention, that the access network device is an eNodeB is only used as an example for description. Certainly, when the access network device is a base station including a BBU and an RRU, for a method of transmitting data between the base station including a BBU and an RRU and the UE, reference may be made to descriptions of S701 to S708 in this embodiment of the present invention. Details are not described in this embodiment of the present invention.

Certainly, the eNodeB may also determine whether the uplink frequency shift determined in S7021 is greater than a first preset threshold to determine whether to use the data transmission method provided in the present invention. That is, after S7021, if determining that the uplink frequency shift is greater than the first preset threshold, the eNodeB uses the data transmission method provided in the present invention to perform data transmission with the UE; and if determining that the uplink frequency shift is less than the first preset threshold, the eNodeB uses the prior-art solution to perform data transmission with the UE. Certainly, when the uplink frequency shift is equal to the first preset threshold, the eNodeB may use the data transmission method provided in the present invention to perform data transmission with the UE, or may use a prior-art solution to perform data transmission with the UE. A specific method may be selected according to an actual application scenario need. This is not specifically limited in this embodiment of the present invention.

According to the data transmission method provided in this embodiment of the present invention, after the eNodeB determines that a moving speed of UE is greater than a preset threshold, the eNodeB may determine a downlink frequency shift according to a received uplink signal sent by the UE, perform frequency compensation for a first transmit frequency according to the determined downlink frequency shift, to obtain a second transmit frequency, and send a downlink signal to the UE according to the second transmit frequency. Before sending the downlink signal, the eNodeB has performed compensation for the first transmit frequency. In this way, the downlink signal received by the UE may be basically free from a frequency shift, so that the UE may directly receive and demodulate the downlink signal according to a receive frequency corresponding to the first transmit frequency. This improves demodulation performance for the downlink signal, thereby improving an average downlink throughput of the UE.

Figure 8:
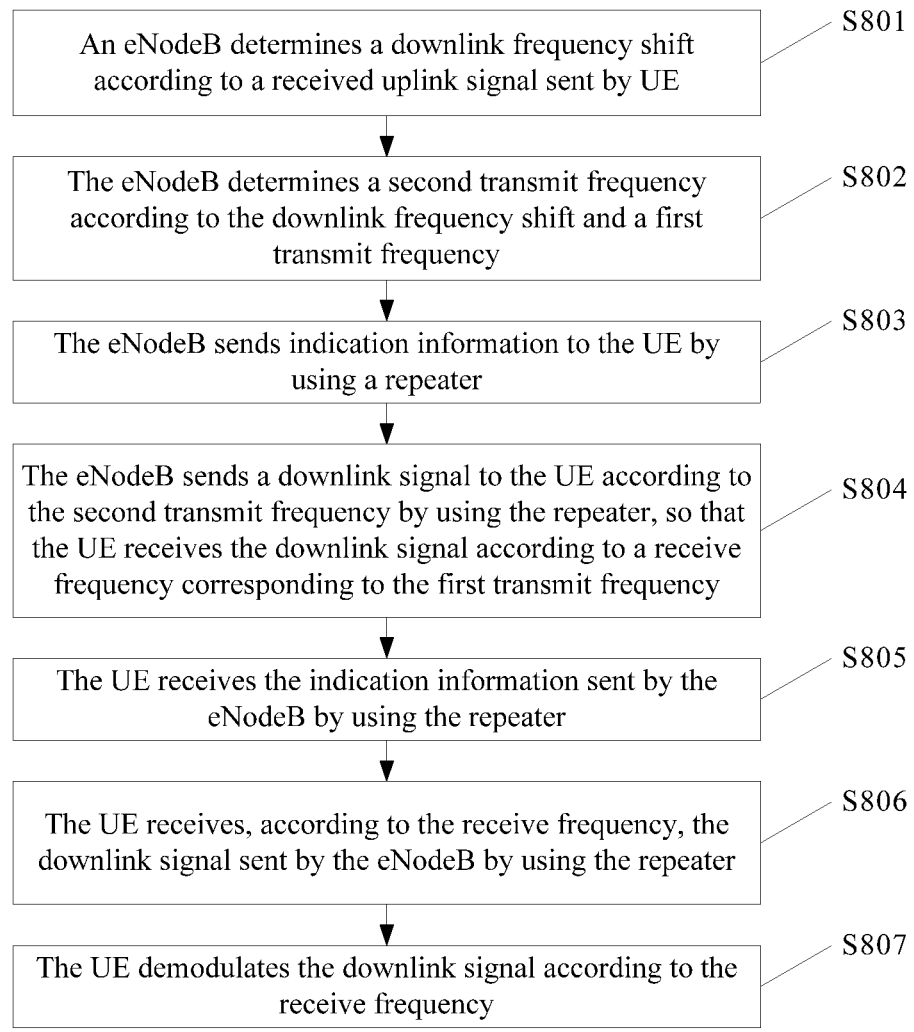
FIG. 8 is a flowchart of another data transmission method according to another embodiment of the present invention.

In a scenario in which a repeater is installed on a high-speed train, an access network device is an eNodeB or a base station including a BBU and an RRU, and a terminal device is UE. That the access network device is an eNodeB is used as an example for description, and a data transmission method in this application scenario is shown in FIG. 8. Specifically, the method may include the following steps.

S801: The eNodeB determines a downlink frequency shift according to a received uplink signal sent by the UE.

Specifically, S801 may include S8011 to S8012:

S8011: The eNodeB determines an uplink frequency shift according to the received uplink signal sent by the UE.

S8012: The eNodeB determines the downlink frequency shift according to the uplink frequency shift.

S802: The eNodeB determines a second transmit frequency according to the downlink frequency shift and a first transmit frequency.

S803: The eNodeB sends indication information to the UE by using a repeater (Repeater).

The indication information is used to indicate that the eNodeB has performed frequency compensation.

S804: The eNodeB sends a downlink signal to the UE according to the second transmit frequency by using the repeater (Repeater), so that the UE receives the downlink signal according to a receive frequency corresponding to the first transmit frequency.

After the repeater receives the downlink signal sent by the eNodeB according to the second transmit frequency, the repeater amplifies power of the received downlink signal, and sends the downlink signal whose power has been amplified to the UE.

S805: The UE receives the indication information sent by the eNodeB by using the repeater.

S806: The UE receives, according to the receive frequency, the downlink signal sent by the eNodeB by using the repeater.

The receive frequency is corresponding to the first transmit frequency.

S807: The UE demodulates the downlink signal according to the receive frequency.

It should be noted that, for specific descriptions of S801 to S807 in this embodiment of the present invention, reference may be made to specific descriptions of S501 to S507, and details are not described in this embodiment of the present invention.

It should be noted that in S801 to S807 in this embodiment of the present invention, that the access network device is an eNodeB is only used as an example for description. Certainly, when the access network device is a base station including a BBU and an RRU, for a method of transmitting data between the base station including a BBU and an RRU and the UE, reference may be made to descriptions of S801 to S807 in this embodiment of the present invention. Details are not described in this embodiment of the present invention.

According to the data transmission method provided in this embodiment of the present invention, after an eNodeB determines a downlink frequency shift according to a received uplink signal sent by UE, the eNodeB may perform frequency compensation for a first transmit frequency according to the determined downlink frequency shift, to obtain a second transmit frequency, and sends a downlink signal to the UE according to the second transmit frequency by using a repeater. Before sending the downlink signal, the eNodeB has performed compensation for the first transmit frequency. In this way, the downlink signal received by the UE may be basically free from a frequency shift, so that the UE may directly receive and demodulate the downlink signal according to a receive frequency corresponding to the first transmit frequency. This improves demodulation performance for the downlink signal, thereby improving an average downlink throughput of the UE.

Figure 9:
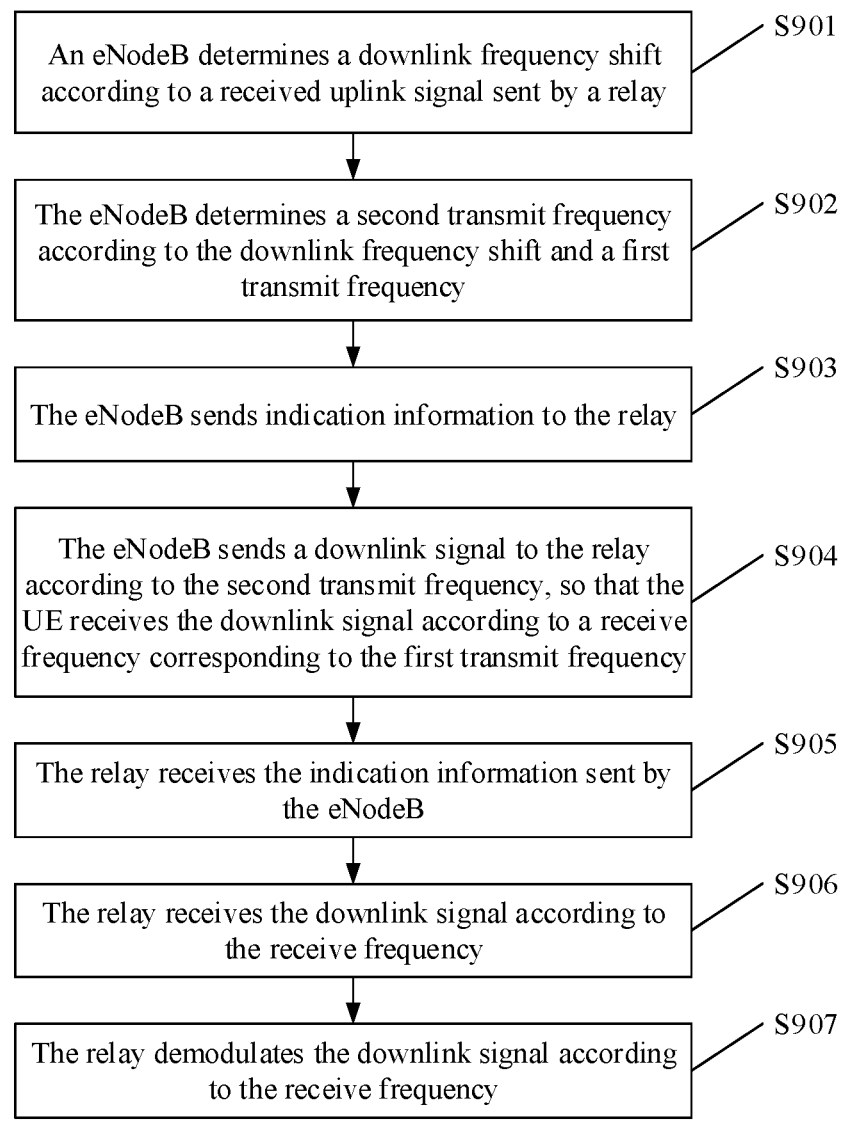
FIG. 9 is a flowchart of another data transmission method according to another embodiment of the present invention.

In a scenario in which a relay is installed on a high-speed train, an access network device is an eNodeB or a base station including a BBU and an RRU, and a terminal device is a relay. That the access network device is an eNodeB is used as an example for description, and a data transmission method in this application scenario is shown in FIG. 9. Specifically, the method may include the following steps.

S901: The eNodeB determines a downlink frequency shift according to a received uplink signal sent by the relay.

Specifically, S901 may include S9011 to S9012:

S9011: The eNodeB determines an uplink frequency shift according to a received uplink signal sent by the relay.

S9012: The eNodeB determines the downlink frequency shift according to the uplink frequency shift.

S902: The eNodeB determines a second transmit frequency according to the downlink frequency shift and a first transmit frequency.

S903: The eNodeB sends indication information to the relay.

The indication information is used to indicate that the eNodeB has performed frequency compensation.

S904: The eNodeB sends a downlink signal to the relay according to the second transmit frequency, so that the UE receives the downlink signal according to a receive frequency corresponding to the first transmit frequency.

S905: The relay receives the indication information sent by the eNodeB.

S906: The relay receives the downlink signal according to the receive frequency.

The receive frequency is corresponding to the first transmit frequency.

S907: The relay demodulates the downlink signal according to the receive frequency.

After demodulating the downlink signal according to the receive frequency, the relay independently schedules UE under coverage of the relay. That is, the relay regenerates a downlink signal according to a quality of a link between the relay and the UE, and sends the downlink signal to the UE.

It should be noted that, for specific descriptions of S901 to S907 in this embodiment of the present invention, reference may be made to specific descriptions of S501 to S507, and details are not described in this embodiment of the present invention.

It should be noted that in S901 to S907 in this embodiment of the present invention, that the access network device is an eNodeB is only used as an example for description. Certainly, when the access network device is a base station including a BBU and an RRU, for a method of transmitting data between the base station including a BBU and an RRU and the UE, reference may be made to descriptions of S901 to S907 in the embodiments of the present invention. Details are not described in this embodiment of the present invention.

According to the data transmission method provided in this embodiment of the present invention, after an eNodeB determines a downlink frequency shift according to a received uplink signal sent by a relay, the eNodeB may perform frequency compensation for a first transmit frequency according to the determined downlink frequency shift, to obtain a second transmit frequency, and sends a downlink signal to the relay according to the second transmit frequency. Before sending the downlink signal, the eNodeB has performed compensation for the first transmit frequency. In this way, the downlink signal received by the relay may be basically free from a frequency shift, so that the relay may directly receive and demodulate the downlink signal according to a receive frequency corresponding to the first transmit frequency. This improves demodulation performance for the downlink signal, thereby improving an average downlink throughput of the relay.

In addition, on a basis that the average downlink throughput of the relay is improved, the relay may reschedule the UE under coverage of the relay, and there is no relative movement between the relay and the UE. Therefore, an average downlink throughput of the UE is improved by using the technical solution provided in this embodiment of the present invention.

Figure 10:
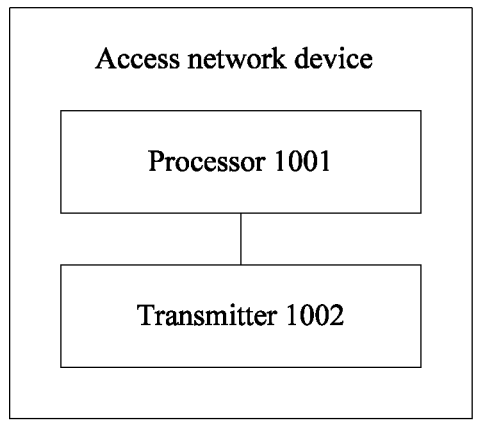
FIG. 10 is a schematic structural diagram of an access network device according to another embodiment of the present invention.

Another embodiment of the present invention provides an access network device. As shown in FIG. 10, the access network device may include a processor 1001 and a transmitter 1002.

The processor 1001 is configured to determine a downlink frequency shift according to a received uplink signal sent by a terminal device, and determine a second transmit frequency according to the downlink frequency shift and a first transmit frequency.

The transmitter 1002 is configured to send a downlink signal to the terminal device according to the second transmit frequency determined by the processor 1001, so that the terminal device receives the downlink signal according to a receive frequency corresponding to the first transmit frequency, where the downlink signal includes at least one of a demodulation reference signal DMRS or downlink data.

In this embodiment of the present invention, further, the transmitter 1002 is further configured to send indication information to the terminal device before sending the downlink signal to the terminal device according to the second transmit frequency. The indication information is used to indicate that the access network device has performed frequency compensation.

In this embodiment of the present invention, further, the transmitter 1002 is specifically configured to send the indication information to the terminal device by using a radio resource control RRC connection reconfiguration message.

In this embodiment of the present invention, further, the transmitter 1002 is specifically configured to send the indication information to the terminal device by using a system message.

In this embodiment of the present invention, further, the processor 1001 is specifically configured to determine an uplink frequency shift according to the uplink signal, and determine the downlink frequency shift according to the uplink frequency shift.

The uplink frequency shift and the downlink frequency shift satisfy the following condition:

$$\Delta fDL = 0.5 * \Delta fUL,$$ where $\Delta fDL$ is the downlink frequency shift, and $\Delta fUL$ is the uplink frequency shift.

In this embodiment of the present invention, further, the processor 1001 is further configured to: after determining the uplink frequency shift according to the uplink signal, determine that the uplink frequency shift is greater than a first preset threshold.

In this embodiment of the present invention, further, the processor 1001 is further configured to: before determining the downlink frequency shift according to the received uplink signal sent by the terminal device, determine that a moving speed of the terminal device is greater than a second preset threshold.

After determining a downlink frequency shift, the access network device provided in this embodiment of the present invention determines a second transmit frequency according to the determined downlink frequency shift and a first transmit frequency, to implement frequency compensation for the first transmit frequency; and sends a downlink signal to a terminal device according to the second transmit frequency. Performance of the access network device is superior to performance of the terminal device, that is, there is a relatively small error between the downlink frequency shift estimated by the access network device and an actual downlink frequency shift in a network, and the access network device can compensate for a relatively large downlink frequency shift. Therefore, before the access network device sends the downlink signal to the terminal device, the access network device may estimate the downlink frequency shift, perform frequency compensation for the first transmit frequency according to the estimated downlink frequency shift, to obtain the second transmit frequency, and send the downlink signal to the terminal device according to the second transmit frequency. In this way, the downlink signal received by the terminal device may be basically free from a frequency shift, so that the terminal device may directly receive the downlink signal according to a receive frequency corresponding to the first transmit frequency, and demodulate the downlink signal according to the receive frequency. This improves demodulation performance for the downlink signal, thereby improving an average downlink throughput of the terminal device.

Figure 11:
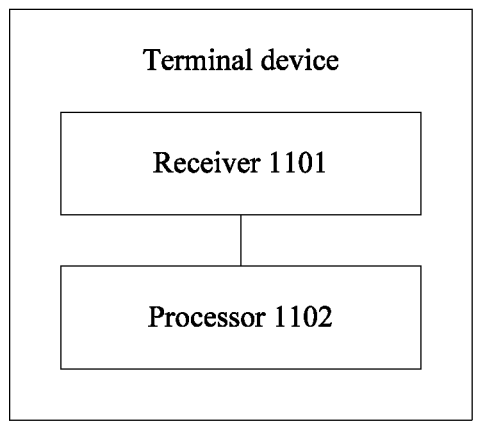
FIG. 11 is a schematic structural diagram of a terminal device according to another embodiment of the present invention.

Another embodiment of the present invention provides a terminal device. As shown in FIG. 11, the terminal device may include a receiver 1101 and a processor 1102.

The receiver 1101 is configured to receive a downlink signal according to a receive frequency, where the receive frequency is corresponding to a first transmit frequency, the downlink signal is sent by an access network device to the terminal device according to a second transmit frequency, the second transmit frequency is determined by the access network device according to a downlink frequency shift and the first transmit frequency, and the downlink signal includes at least one of a demodulation reference signal DMRS or downlink data.

The processor 1102 is configured to demodulate, according to the receive frequency, the downlink signal received by the receiver 1101.

In this embodiment of the present invention, further, the receiver 1101 is further configured to: before receiving the downlink signal according to the receive frequency, receive indication information sent by the access network device, where the indication information is used to indicate that the access network device has performed frequency compensation.

According to the terminal device provided in this embodiment of the present invention, a downlink signal is received according to a receive frequency corresponding to a first transmit frequency. The downlink signal is sent by an access network device to the terminal device according to a second transmit frequency. The second transmit frequency is determined by the access network device according to a downlink frequency shift and the first transmit frequency. After the downlink signal is received, the downlink signal may be demodulated according to the receive frequency. Performance of the access network device is superior to performance of the terminal device, that is, there is a relatively small error between the downlink frequency shift estimated by the access network device and an actual downlink frequency shift in a network, and the access network device can compensate for a relatively large downlink frequency shift. Therefore, before the access network device sends the downlink signal to the terminal device, the access network device may estimate the downlink frequency shift, perform frequency compensation for the first transmit frequency according to the estimated downlink frequency shift, to obtain the second transmit frequency, and send the downlink signal to the terminal device according to the second transmit frequency. In this way, the downlink signal received by the terminal device may be basically free from a frequency shift, so that the terminal device may directly receive the downlink signal according to a receive frequency corresponding to the first transmit frequency, and demodulate the downlink signal according to the receive frequency. This improves demodulation performance for the downlink signal, thereby improving an average downlink throughput of the terminal device.

Figure 12:
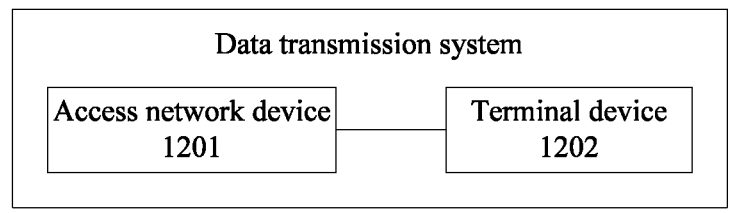
FIG. 12 is a schematic diagram of an architecture of a data transmission system according to another embodiment of the present invention.

Another embodiment of the present invention provides a data transmission system. As shown in FIG. 12, the system includes an access network device 1201 and a terminal device 1202.

The access network device 1201 is configured to: determine a downlink frequency shift according to a received uplink signal sent by the terminal device 1202; determine a second transmit frequency according to the downlink frequency shift and a first transmit frequency; and send a downlink signal to the terminal device 1202 according to the second transmit frequency, so that the terminal device 1202 receives the downlink signal according to a receive frequency corresponding to the first transmit frequency, where the downlink signal includes at least one of a demodulation reference signal DMRS or downlink data.

The terminal device 1202 is configured to receive the downlink signal according to the receive frequency, and demodulate the downlink signal according to the receive frequency. The receive frequency is corresponding to the first transmit frequency.

According to the data transmission system provided in this embodiment of the present invention, after determining a downlink frequency shift, an access network device determines a second transmit frequency according to the determined downlink frequency shift and a first transmit frequency, to implement frequency compensation for the first transmit frequency, and sends a downlink signal to a terminal device according to the second transmit frequency. Performance of the access network device is superior to performance of the terminal device, that is, there is a relatively small error between the downlink frequency shift estimated by the access network device and an actual downlink frequency shift in a network, and the access network device can compensate for a relatively large downlink frequency shift. Therefore, before the access network device sends the downlink signal to the terminal device, the access network device may estimate the downlink frequency shift, perform frequency compensation for the first transmit frequency according to the estimated downlink frequency shift, to obtain the second transmit frequency, and send the downlink signal to the terminal device according to the second transmit frequency. In this way, the downlink signal received by the terminal device may be basically free from a frequency shift, so that the terminal device may directly receive the downlink signal according to a receive frequency corresponding to the first transmit frequency, and demodulate the downlink signal according to the receive frequency. This improves demodulation performance for the downlink signal, thereby improving an average downlink throughput of the terminal device.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, multiple units or components may be combined or integrated into another apparatus, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access network device comprising:
   a processor to determine a downlink frequency shift according to a received uplink signal sent by a terminal device, and determine a second transmit frequency according to the downlink frequency shift and a first transmit frequency; and
   a transmitter to send a downlink signal to the terminal device according to the second transmit frequency determined by the processor and to send indication information to the terminal device, wherein the downlink signal comprises downlink data, and the indication information instructs the terminal device not to perform frequency compensation.

2. The access network device according to claim 1, wherein
   the transmitter is configured to send the indication information to the terminal device by using a radio resource control (RRC) connection reconfiguration message.

3. The access network device according to claim 1, wherein
   the transmitter is configured to send the indication information to the terminal device by using a system message.

4. The access network device according to claim 1, wherein
   the processor is configured to determine an uplink frequency shift according to the uplink signal, and determine the downlink frequency shift according to the uplink frequency shift, wherein the uplink frequency shift and the downlink frequency shift satisfy the following condition:

$\Delta fDL=0.5*\Delta fUL$, wherein $\Delta fDL$ is the downlink frequency shift, and $\Delta fUL$ is the uplink frequency shift.

5. The access network device according to claim 4, wherein
   the processor is further configured to: determine that the uplink frequency shift is greater than a first preset threshold.

6. The access network device according to claim 1, wherein
   the processor is further configured to: determine that a moving speed of the terminal device is greater than a second preset threshold.

7. A terminal device comprising:
   a receiver to receive a downlink signal according to a receive frequency and to receive indication information from an access network device, wherein the receive frequency is corresponding to a first transmit frequency, the downlink signal is sent by the access network device to the terminal device according to a second transmit frequency, the second transmit frequency is determined according to a downlink frequency shift and the first transmit frequency, the downlink signal comprises downlink data, and the indication information instructs the terminal device not to perform frequency compensation; and
   a processor to demodulate, according to the receive frequency, the downlink signal received by the receiver.

8. The terminal device according to claim 7, further comprising:
   a transmitter, configured to send an uplink signal to the access network device for implying the downlink frequency shift.

9. A method of data transmission comprising:
   determining, by an access network device, a downlink frequency shift according to a received uplink signal sent by a terminal device;
   determining, by the access network device, a second transmit frequency according to the downlink frequency shift and a first transmit frequency;
   sending, by the access network device, a downlink signal to the terminal device according to the second transmit frequency, wherein the downlink signal comprises downlink data; and
   sending indication information to the terminal device, and the indication information instructs the terminal device not to perform frequency compensation.

10. The method according to claim 9, wherein the sending, by the access network device, indication information to the terminal device comprises:
    sending, by the access network device, the indication information to the terminal device by using a radio resource control (RRC) connection reconfiguration message.

11. The method according to claim 9, wherein the sending, by the access network device, indication information to the terminal device comprises:
    sending, by the access network device, the indication information to the terminal device by using a system message.

12. The method according to claim 9, wherein the determining, by the access network device, the downlink frequency shift according to the received uplink signal sent by the terminal device comprises:
    determining, by the access network device, an uplink frequency shift according to the uplink signal; and
    determining, by the access network device, the downlink frequency shift according to the uplink frequency shift, wherein the uplink frequency shift and the downlink frequency shift satisfy the following condition:

$\Delta fDL=0.5*\Delta fUL$, wherein $\Delta fDL$ is the downlink frequency shift, and $\Delta fUL$ is the uplink frequency shift.

13. The method according to claim 12, wherein the method further comprises:
    determining, by the access network device, that the uplink frequency shift is greater than a first preset threshold.

14. The method according to claim 9, wherein the method further comprises:
    determining, by the access network device, that a moving speed of the terminal device is greater than a second preset threshold.

15. A method of data transmission, comprising:
- receiving, by a terminal device, a downlink signal according to a receive frequency, wherein the receive frequency is corresponding to a first transmit frequency, the downlink signal is sent by an access network device to the terminal device according to a second transmit frequency, the second transmit frequency is determined according to a downlink frequency shift and the first transmit frequency, and the downlink signal comprises downlink data;
- demodulating, by the terminal device, the downlink signal according to the receive frequency; and
- receiving indication information from the access network device, wherein the indication information instructs the terminal device not to perform frequency compensation.

16. The method according to claim 15, wherein the method further comprises:
- sending an uplink signal to the access network device for implying the downlink frequency shift.

* * * * *